Feb. 17, 1970 S. H. PITT 3,495,528

INTERPRETING AND PRINTING DEVICE FOR PUNCHED PAPER TAPE

Filed April 29, 1965 2 Sheets-Sheet 1

INTERPRETING AND PRINTING DEVICE FOR PUNCHED PAPER TAPE

Filed April 29, 1965 2 Sheets-Sheet 2

INVENTOR
SOLOMON H. PITT

BY [signature]

ATTORNEY 3,495,528

INTERPRETING AND PRINTING DEVICE FOR PUNCHED PAPER TAPE

Solomon H. Pitt, Norristown, Pa., assignor to Sperry Rand Corporation, New York, N.Y., a corporation of Delaware Filed Apr. 29, 1965, Ser. No. 451,926
Int. Cl. B41j 5/38
U.S. Cl. 101—93 7 Claims

ABSTRACT OF THE DISCLOSURE

A paper tape interpreter-punch is described wherein a paper tape is first punched at a punch station and the punched tape output from the punch station is collected in a loop. A tape drive means is actuated after a predetermined number of characters have been punched in the tape to move a predetermined amount of tape out of the loop past a read station to a printing station. As the tape moves past tthe read station the punched information in the tape is read and causes the printing station to imprint symbols on the tape which are representative of the punched information.

This invention relates to a record interpreting device and more particularly to a device for interpreting and printing at preselected positions on a record the information read from such record.

The availability of punched record devices, including punched paper tape, together with its low cost makes such equipment highly suitable for use with computing and data processing systems in the intermediate speed range. The record employed may be of indeterminate length, from a few feet to many hundreds of feet, and may be constructed from materials such as paper, cardboard stock, plastic coated paper, plastic or the like. Data is punched in the record in a series of carefully spaced row positions along the length of the record. At each of these row positions, a number of apertures may be placed across the width of the record to store a particular character in coded notation together with a synchronizing aperture. Common among the codes used to represent data, is the 5, 6 and 8 level codes. In a five level code, there will be a maximum of five apertures placed in any row position as well as a single position for synchronization purposes known as a sprocket, which will occur whether or not information is recorded. In the six and eight level coding arrangements there are maximum number of six or eight apertures respectively in each row position across the width of the tape plus the sprocket aperture.

Unless one is quite familiar with the coded notation on the punched record, it is not possible for one to read the content of the record. Further, it is difficult to determine the start and end of any messages which are contained in the record. In this respect, it should be recalled that each row position contains the apertures required to express a single character and that a plurality of these row positions are necessary to complete a word and an entire message.

Certain devices available in the prior art will interpret the material punched record such as in a punch paper tape. As is well known, an interpreting device will provide a printed copy on the record itself of the information which has been punched into the record. These printed characters make reading of the record by the operation possible without the use of further equipment. Punch paper tape interpreters which are presently available generally print upon the record at the same time as the original punch mechanism is operated. Stated another way, the same input signal will be used to set up the printing mechanism as is used to set up the punching mechanism. Thus, should there be an erroneous signal transmitted, the device will punch and print the same erroneous character. In such a case, the error will be apparent immediately to the operator. However, a case in which the error is not obvious to an operator is one where the same input signal causes the punch to punch one character while the printing device prints a different character. In this instance, it is not possible to tell by means of reading the printed character that an error has occurred for the correct character may be printed but an erroneous character code punched. In that it will be the punched paper tape itself which may be used as an input for further transmissions or further data processing, the correctness of the printed character is insufficient to guard the accuracy of the punched paper tape message.

In accordance with the present invention, a true punch paper tape interpreter is provided wherein paper tape may be perforated or punched in a record perforating station and then advanced in synchronism to a paper tape reading interpreting device which consists of a reading station and a printing station. The information which has been punched into the paper tape is then read at the read station and in accordance therewith the printing device is set up to cause the printing of the character read. Thus, if erroneous punching has taken place, the character which is printed upon the paper tape truly represents the punched character, and the error may quickly be discovered. Due to a novel arrangement of the various record advancing mechanisms, synchronism of record movement is provided as the record moves from the record perforating station to the interpreting station. It is therefore an object of this invention to provide an improved punched record interpreting device.

It is another object of this invention to provide an improved punched paper tape interpreting device.

It is still another object of this invention to provide a punch paper tape interpreting device wherein paper tape may be perforated in a perforating device and its movement controlled through both the perforating device and the following interpreting device in synchronism.

It is another object of this invention to provide a record interpreting device wherein records prepared in an associated record perforating device or a remote record perforating device may be fed to said interpreting device to produce a printed indication of the character actually punched within said record.

It is still another object of this invention to provide a record interpreting device whereby it is possible to determine the accuracy of information punched into a record of indeterminate length.

It is yet another object of this invention to provide a record interpreting device wherein a printed character may be placed upon said record at a selected position with respect to the corresponding punched character code.

Other objects and features of the invention will be pointed out in the following description and claims and illustrated in the accompanying drawings, which disclose, by way of example, the principles of the invention, and the best mode which has been contemplated for carrying it out.

In the figures:

FIGURE 1, consisting of FIGURES 1*a* and 1*b* is a highly schematic representation of a record perforating-record interpreting machine constructed in accordance with the concepts of this invention.

Similar elements will be given similar reference characters in each of the respective figures.

Figures 1, 1B:
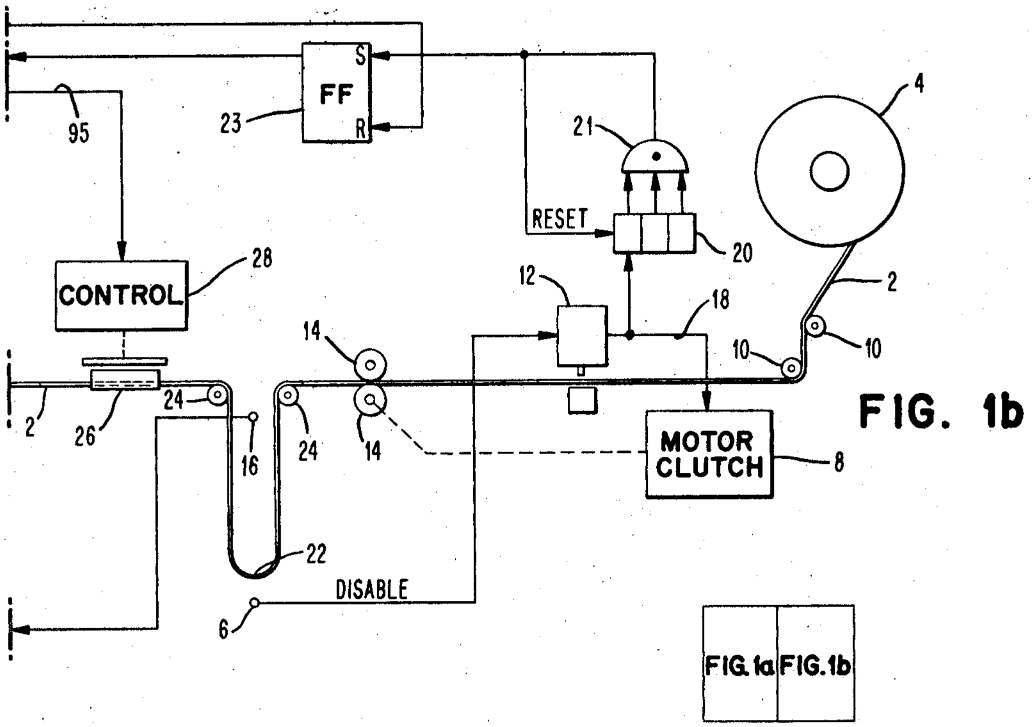
Figure 3:
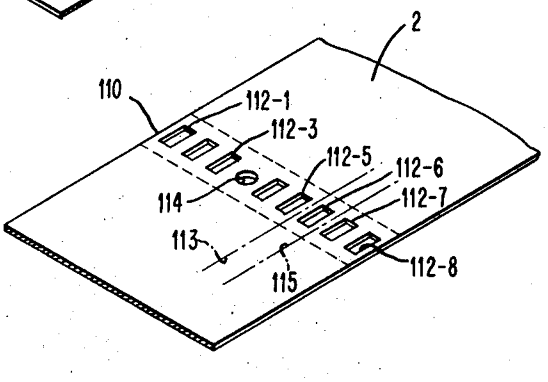
FIGURE 3 is a highly simplified representation of a portion of a punched record employed with the invention of FIGURE 1.
Figure 1A:
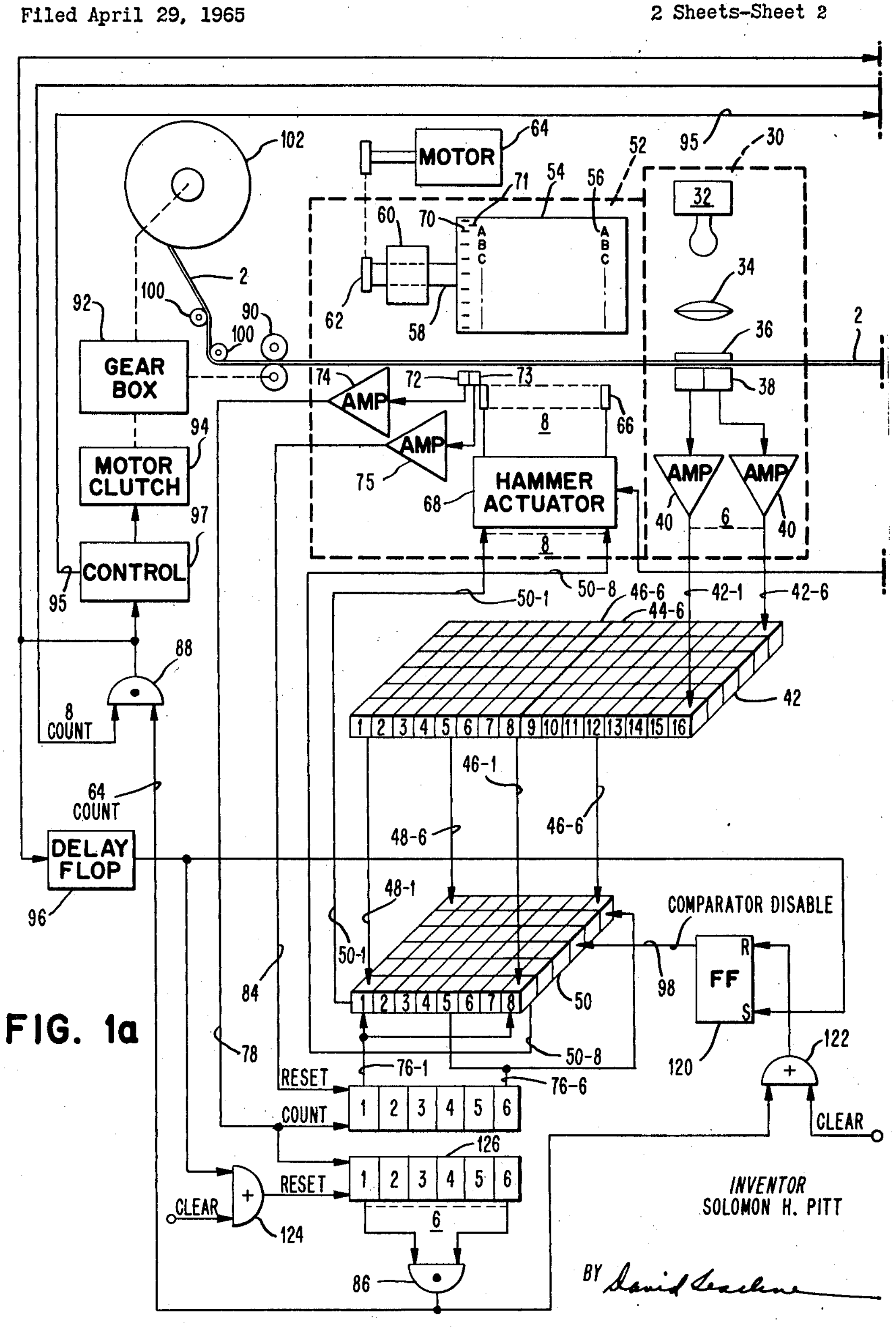

Turning now to FIG. 3, there is illustrated a portion of a record 2 which is capable of being used with the record perforating-record interpreting device of FIGURE 1. Across the width of the record 2, which may be paper, cardboard stock, a plastic-paper composition, plastic or the like is found a plurality of indicia bearing row positions 110. In each of these indicia bearing row positions 110, there will be found a plurality of punch apertures 112–1 through 112–8. In addition, in each of these indicia bearing row positions 110 there is also found a sprocket aperture 114. Although the indicia bearing apertures 112–1 to 112–8 have been shown as rectangular and the sprocket aperture 114 is shown as circular, they have been so shown for exemplary purposes only. The apertures employed may take any shape which is convenient for use with both the punch and reading device to be employed. Further, the record 2 is shown perforated with apertures in each of the eight possible positions along the width of the record to show the relative position of the sprocket aperture 114 with respect to the remaining indicia apertures 112. It should be understood, that only the sprocket aperture 114 need appear at any indicia row position and that as many indicia apertures 112 will appear as are necessary to express the coded character. To illustrate, row positions 110A and 110B show the ASCII code for the alphabetic character A and B respectively. As indicated by this example, a hole is punched in positions 112–1 and 112–7 for the character A and in positions 112–2 and 112–7 for the character B.

In the eight level code, the sprocket aperture 114 is located between the third indicia aperture 112–3 and the fourth indicia aperture 112–4. The remaining indicia apertures 112–1, 112–2, and 112–5 to 112–8 will extend as shown on both sides of the sprocket aperture 114. In the five level code, the sprocket position is the same as in the eight level code, but fewer indicia apertures are present. The dashed line 113, shown between the indicia apertures 112–5 and 112–6 indicates the arrangement of the sprocket aperture 114 and the indicia apertures 112–1 to 112–5 for a five level code. The dashed line 115, shown between the indicia apertures 112–6 and 112–7, indicates the arrangement of the sprocket aperture 114 and the indicia apertures 112–1 to 112–6 for a six level code. It should be quite obvious, that regardness of the code employed, the sprocket aperture and common indicia aperture positions for all codes are placed in uniform spatial positions along the record 2 width. By standardizing the location of the sprocket aperture 114 for the five, six and eight level codes or for any other usable code, it is possible to use a similar record advancing mechanism and reading device regardless of the coding of the record itself. It should be understood, that the sprocket aperture 114 is placed in the record 2 at the same time as the record 2 is punched with indicia representative of a coded character, and further that sprocket apertures 114 will be placed in the record 2 despite the fact that no information is to be punched in the record 2 at that row position. As is well known in the punched record art, the sprocket apertures provide a means for record advance as well as record synchronization and their presence is vital to properly synchronized operation.

Turning now to FIGURE 1, a record interpreting device constructed in accordance with the basic concepts of this invention is set forth. The record 2 which may be a paper tape of indeterminate length is coiled on a supply reel 4. The record 2 is advanced by means of the advance rolls 14 driven by a motor/clutch unit 8 capable of making a single revolution for each actuation thereof. For each revolution of the motor/clutch unit 8, the record 2 will be advanced an amount equal to the distance between adjacent indicia row positions.

The supply reel 4 is caused to unreel the record 2 by the advancing of the record 2 under control of the advance rolls 14. From the supply reel 4, the record 2 passes between a set of guide rolls 10 into the punch mechanism 12.

The punch mechanism as shown is highly schematic and shows a device for punching the record 2 in the serial mode in either the five, six or eight level or any other convenient code. The punch mechanism 12 includes a plurality of indicia aperture punch bars as well as a punch bar for the punching of the sprocket aperture at the same time. Paper tape punching devices of this type are well known in the art, and the specific characteristics of the device form no particular part of this invention and will not be described in further detail. At the end of each punch operating cycle, when an indicia row position has been punched, a signal will be generated by the punching mechanism 12 and applied to an input of a three stage binary counter 20. This signal, which could for example be generated in the manner shown in U.S. Patent 2,609,433, will also be applied via the line 18 to the input of the motor/clutch unit 8. Thus, for each punching operation, a signal will be generated which will cause the record 2 to be advanced by the advance rolls 14 an amount equal to the distance between adjacent indicia row positions. The signal applied to the binary counter 20 will cause the counter to count up thus registering the number of punch operations which have taken place during a given period.

Upon leaving the punch mechanism 12, the record 2 will pass between the advancing rolls 14 over idler rolls 24 into a tape loop buffer unit 22. The buffer loop is necessary, as well be pointed out below, to match the step by step operation of the punching mechanism 12 to the on the fly or continuous motion reading device 30 which reads the record in incrmental step movements of 8 indicia row positions as will be described below. The buffer loop 22 will consist of a length of the record 2 equal to the distance between at least 10 indicia row positions. In this manner, there will always be an amount of the record within the buffer loop 22 when the interpreting device requires the movement of the record therein so as to prevent the possible tearing or destruction of the record 2 in the punch station.

To insure the buffer loop remains within prescribed safe limits two limit sensors, which may be photoelectric, mechanical or the like are provided. Sensor 6 senses excess loop length and disables the punch mechanism 12 until the loop length is decreased whereas sensor 16 senses insufficient loop length and disables the print mechanism 52 until the loop length is increased.

After leaving the buffer loop 22, the record 2 passes over a further guide roll 24 and through a record guide and brake 26. The function of the record guide and brake 26 will be described below in greater detail with reference to FIG. 2. At present, it is sufficient to state that the record guide and brake 26 will permit the record 2 to be moved in the correct spatial relationship from the punch mechanism 12 to the interpreting device. The record guide and brake 26 is controlled by the guide and brake control 28 coupled thereto. The record 2 is then passed from the record guide and brake 26 to the input of the punched paper tape reader 30. The punched paper tape reader 30 may take any convenient form such as a mechanical, fluid or photoelectric reading device. The photoelectric reader described is exemplary and the device is not limited to such a reader. The punched paper tape reader 30 consists of a light source 32 which may be a bulb or any other convenient illuminating device, a lens 34 to concentrate and direct a light from the light source 32 towards the record, a mask 36 to limit the light to the possible aperture positions of the code employed plus the sprocket aperture. The light permitted to pass through the mask 36 and corresponding apertures in the punched record 2 will then impinge upon a set of photoelectric reading cells 38 one for each code position and one for the sprocket position. The outputs will then be passed via amplifiers 40 to inputs of a shift register 42. The shift register 42 will store the indicia read until it can be printed by the printing device of the record interpreter. The shift register 42 consists of sixteen stages, each stage having six levels corresponding to the six levels of a six level code. It should be understood that the number of levels in each stage will be equivalent to the maximum possible number of code positions. The shift register 42 will consist of a flip-flop for each stage, with each flip-flop constructed of devices well known in the art, such as, transistors, tubes or other similar elements. The shift register stages are interconnected on a level to level basis. That is level one of stage one is connected to level one of stage two. Further, the shift register is open ended, meaning that information entered into the lowest order stage is shifted to the highest order stage and then lost on the next shift operation. Shifting of the register is accomplished by the entry of new information into the lowest order stage. Thus, as new information is applied to said lowest order stage via input lines 42–1 to 42–6, information presently stored in said stage is shifted to the next high order stage. The various stages of the shift register 42 are numbered from left to right 1 through 8 and 9 through 16. The heavy line at the boundary between stage 8 and stage 9 indicates that the shift register 42 may be constructed of two shift registers each of 8 stages or alternatively one of the shift register sections may be eliminated as will be described below.

The outputs from the amplifiers 40 are fed into the lowest order stage, stage 16 in the levels 1 to 6 on the lines 42–1 to 42–6, and then shifted towards stage 9. The levels of stage 9 are internally connected to the levels of stage 8 of the second portion of the shift register 42, this portion consisting of the stages 1 through 8. The outputs of the six levels of stage 8 are fed via the lines 46–1 through 46–6 to the comparable stage of a comparator device 50 to be described below. In addition, the outputs of the highest order, that is stage 1 of the shift register 42 are fed via the lines 48–1 through 48–6 to the comparable higher order states of the comparator 50. Thus, information read from the record 2 is initially introduced into the stage designated 16 and as each further indicia row position is read, the information is shifted in the direction towards stage 1. The incoming information is stored in stage 16. It should be understood that although only the first and last output lines, for levels 1 and 6, have been shown for stages 1 and 8, each of the stages 1 through 8 will have six output lines coupling the shift register 42 to similar portions of the comparator 50.

The comparator 50 consists of eight stages of six levels each and serves to produce a series of output signals on the lines 50–1 to 50–8 when the inputs for corresponding levels and stages of the shift register 42 match the inputs from the counter 76 to be described below. For example, level 1 of stage 1 of the comparator 50 may consist of a two input And gate, one input of which is coupled to the output line 48–1 of stage 1 of the shift register 42. The other input is coupled to output line 76–1 of the counter 76. If signals are present on both inputs the And gate will produce an output indicating a match for that level. This output will be coupled to one input of a stage And gate to which the remaining level And gates are also coupled. If all level And gate outputs are present the stage And gate will produce an output on line 50–1 indicating a match between stage 1 of the shift register 42 and the counter 76. Although the comparator 50 is shown to have 6 levels for each stage, the number of levels employed will vary with the code level employed. Further, if a five level code is employed the comparator will be capable of detecting shift signals for shifting between letters and figures and vice versa, and effecting the printing of the correct character. Also coupled to the comparator 50 is a line 98 over which a comparator disable signal is fed. This signal will be produced, as will be described below, when the record 2 is to be moved to prevent printing while the record 2 is in motion. The comparator disable signal is generated by the And gate 21 whose operation will be set out below.

Mounted adjacent the reading station 30 is a record printing station 52. The printing station consists of a continuously rotating type drum 54 extending along the record 2 path for a distance in excess of the total spacing between eight indicia rows. Mounted on the surface of the type drum 54 is printing type 56 in eight type columns corresponding in position to eight record indicia row positions. Only the type 56 for the type columns 1 and 8 have been shown for the sake of simplicity. Each type column will contain a complete printing type font of all of the 64 characters which can be printed. Similar type in each column will be aligned in a row so that the same character type 56 is presented to each indicia row position at the same time. In addition to the type 56, which appears about the periphery of the drum, there are additional marks 70 and 71 recorded on the surface of the type drum 54 to provide for certain timing and counting information. There is one flag mark 71 placed on the type drum 54 to indicate the start of a drum rotation and this mark will provide a reset signal for counter 76. The code marks 70 correspond in position and number to the type 56 and will cause the counting of counter 76 so that the count in counter 76 will always represent the code of the next character available at the hammer position. On the other side of the record 2, that is below the record 2, are mounted a bank of eight hammers 66 which are in turn controlled by eight print hammer actuator circuits 68. The print hammer actuator circuits 68 are coupled to the eight output lines 50–1 through 50–8 of the comparator 50. The code marks 70 on the periphery of the type drum 54 are read by means of reluctance pickup 72 which passes a signal via the amplifier 74 and a count line 78 to the input of a six stage binary counter 76.

The count in the counter 76 will at all times reflect the code of the next type 56 to be available at the print line. Thus, the code of this type 56 can be compared in comparator 50 with the codes of the character stored in the shift register 42. When comparison is found, the outputs on the lines 50–1 to 50–8 will cause printing when the type drum 52 has rotated the proper type 56 to the print line. The flag mark is read by the reluctance pickup 73 and a signal is passed via amplifier 75 to the reset input 84 of the counter 76. The flag mark, which corresponds to the start position of a type drum 54 rotation, will thus reset the counter 76 at the start of each rotation regardless of whether the counter 76 had been reset by the normal counting of a full set of code marks.

The type drum 54 is cantilever mounted on the shaft 58, which passes through a bearing 60, to a pulley 62. The pulley 62 is connected by means of a belt to a further pulley which in turn is connected to a drive motor 64.

The cantilevered mounting of the type drum 54 permits a closer mounting of the type drum 54 to the reading station 30 than is possible with a type drum supported at both ends. The record 2 is advanced through the printing station 52 by a set of drive rolls 90 then passed between a set of idler rolls 100 to a takeup reel 102. The takeup reel 102 is driven via a linkage by means of a gear box 92 which also serves to drive the tape drive rolls 90 via a separate linkage. The gear box 92 in turn is driven by the motor/clutch 94 controlled by control 97. Each time the motor/clutch 94 is operated by control 97, as will be described below, a signal is issued over the line 95 to operate the tape guide and brake control 28. The control 97 is operated by the output of an And gate 88 which receives on the first of its inputs the output of the flip-flop 23 set by the output of the binary counter 20, and at the second of its outputs, the output of a further And gate 86 which is in turn coupled to the outputs of the binary counter 126.

A further six stage binary counter 126 is provided to determine the period during which printing can take place and prevent unwanted overprinting. It is assumed that all printing will take place during a single revolution of the type drum 54 and thus it is necessary to note when printing begins and disable the printer after a full type drum 54 revolution has taken place with reference to the start of printing. The counter 76, which provides the coded notation indicative of the next type character available for printing, cannot perform this function since it begins its count on the first count mark 70 after the flag mark 71 regardless of whether or not printing can commence at that time. Thus, it is highly likely that the record 2 will not be stabilized and printing initiated until after a portion of the type 56 has already been presented to the print line. The counter 126, however, is controlled by the delay flop 96 to initiate counting only after the record 2 has been advanced and stabilized and printing may begin. The output of delay flop 96 is also fed to the set input of the flip-flop 120 to set it. The reset output of the flip-flop 120 applies via line 98 a comparator disable signal to comparator 50. The delay flop 96 is responsive to the output of the And gate 88, as described above, which will issue an output only when a sufficient amount of the record 2 has been added to the buffer loop 22 and a print operation has been completed. During the time between the application of an input to the delay flop 96 and the time it issues an output a sufficient delay is provided to permit the record 2 to be advanced and stabilized. When the delay flop 96 produces its output a signal is applied to the set input of the flip-flop 120 causing the comparator disable signal to be removed from comparator 50 and applying a reset signal via Or gate 124 to the reset input of counter 126. The printer is now capable of printing in response to any following comparison signals from comparator 50. The counter 126 will also now be operative to count each of the code marks 70 which follow until a full type drum 54 has taken place with reference to the type drum 54 position at which printing was initiated.

Counter 126 is reset by either a clear signal from an external source (not shown) when interpreter operation is initiated or the output of delay flop 96, both applied via Or gate 124. The counter 126 is counted up by the count signals on the count line 78 from amplifier 74. The outputs of the six stages of the counter 126 are applied to the six input And gate 86. An output is produced by And gate 86 only when counter 126 goes through a full count cycle.

The comparator 50 will also be disable during initiation of interpreter operation by the application of the clear signal to the Or gate 122. Or gate 122 as described above applies a signal to the reset input of flip-flop 120 to produce the comparator disable signal on the line 98.

The motor/clutch 94 is arranged to drive the drive rolls 90 to advance an amount of the record 2 equal to the distance between eight indicia row positions. In a similar manner the takeup reel is rotated an amount sufficient to take up the amount of the record 2 which has been advanced. If desired the takeup reel 102 may be eliminated and the record 2 collected in a collection bin (not shown). The control 97 when operated by And gate 88 will apply a signal over line 95 to the tape guide and brake control 28 to cause the releasing of the brake 26, then the drive rolls 90 and takeup reel 102 will be operated to advance the portion of the record 2 just printed upon, out of the printing mechanism 52 and a further portion to be advanced therein and through the reading station 30. The termination of the output signal on line 95, will cause the tape clamp and brake control 28 to operate the tape clamp and brake 26 to hold the record 2 and prevent motion thereof due to jittering of the drive rolls 90 or the takeup reel 102.

The output of the And gate 88 in addition to being applied to control 97 will also be fed to the reset input of the flip-flop 23 and the input of delay flop 96. A first input to the And gate 88 is the output of And gate 86 which receives at its input the outputs of the six stages of the binary counter 126. The second input to And gate 86 is provided by the set output of flip-flop 23.

The flip-flop 23 is reset by the output of And gate 88 and is set by the output of the And gate 21. The And gate 21 is coupled to the outputs of the three stages of the binary counter 20 and will furnish an output when the eight count condition, as indicated by outputs on each of its three output lines, has been reached. The output of And gate 21 will thus signify that eight indicia row positions have been punched. The output of the And gate 21 is also applied to reset the binary counter 20. The punch mechanism 12 is allowed to continually punch the record 2 adding it to the buffer loop 22. However, as will be set out below, the record 2 can only be moved through the reading station 30 and the printing station 52 at the end of a print operation if an amount of the record 2 equal to eight indicia row positions has been added to the buffer loop 22. This is to prevent possible destruction or mutilation of the record 2. Since the counter 20 is being continually counted through its complete cycle, if there were no device to remember that at least eight indicia row positions had been added to the buffer loop 22, record advance might be delayed until concurrence of the output of And gate 86, monitoring the binary counter 126, and the next output of And gate 21, monitoring the binary counter 20. To prevent this, the flip-flop 23 is set as soon as eight punch cycles have been completed and eight indicia row positions added to the buffer loop. Once the print cycle is over and And gate 86 produces its output, the record advance may be immediately initiated. As noted above, should too much record be added to the buffer loop limit, sensor 6 will disable the punch mechanism 12 until the buffer loop 22 is within proper limits. Alternatively, should the punch mechanism 12 fail to add a sufficient amount of the record 2 to the buffer loop 22, then limit sensor 16 would disable the printing station until enough of the record 2 had been added to the buffer loop 22.

The relationship between the counters 20, 76 and 126 may now be set forth. The counter 20 is counted up by one for each punch operation and causes the record to be advanced through the punch mechanism 12 on a row by row basis. As each row is punched a further amount of the record 2 equal to the distance between adjacent indicia row positions is added to the buffer loop 22. When the counter 20 reaches a count of eight, And gate 21 issues a signal via flip-flop 23 to one input of And gate 88. During the punching operation, the type drum 54 rotates, producing counting pulses on the count line 78 causing the counting up of both of the counters 76 and 126. The comparator 50 will in most instances remain disabled during this time due to the last output of And gate 86, and no printing can take place. When counter 126 reaches a full count, And gate 86 will issue an output signal to attempt to again reset flip-flop 120 via Or gate 122 and to operate And gate 88. The operation of And gate 88, as described above will cause the record 2 to be advanced and delay flop 96 set. After sufficient time for record 2 advance and stabilization delay flop 96 will issue a signal to reset counter 126 and set flip-flop 120 to remove the comparator disable signal. Printing will begin as comparisons are found between the outputs of counter 76 and the shift register 42. Each count pulse will be counted by counter 126 from this time and upon reaching a count of 64 counter 126 will cause the termination of printing and cooperate in the initiation of record advance.

In its operation as monitor of counters 20 and 126, And gate 88 synchronizes the operation of the two record advancing systems which operate at different rates. For example, if the proper amount of the record 2 has not been added to the buffer loop 22 (eight indicia row positions have not been punched) then the record 2 can not be advanced through the interpreter, since to do so might break or mutilate the record 2.

Now that interconnections between the various components of FIGURE 1 have been briefly set out, it is now possible to explain the operation of the device and the various components therein in greater detail. A length of record 2 will be taken from the supply reel 4 and threaded through guide rolls 10, the punch mechanism 12, the drive rolls 14 over the idler roll 24 into the buffer loop 22, and thence over the further idler roll 24. It should be noted that the amount of the record 2 in the buffer loop 22 must be equal to the distance between 10 indicia row positions. As was described above, the record 2 is advanced one indicia row position for each operation of the punch mechanism 12 until eight indicia row positions have been advanced through the punch mechanism 12 into the buffer loop 22, and further that the takeup reel 102 and drive roll 90 advance the record 2 a distance equivalent to eight indicia row positions. Thus, it is necessary that there always be a minimum length of record 2 equal to 10 indicia row positions available in the buffer. The extra length of record 2 is desirable to account for the tolerances of the associated equipment. The record 2 is then threaded over the idler roll 24 through the tape guide and brake 26 and thence through the reader 30, the printing station 52 between the drive rolls 90 over the idler rolls 100 and to the takeup spool 102. With the tape arranged in this manner, the device is now ready to start the record perforating and record interpreting. Input signals will then be fed from an external source (not shown) to the punch mechanism 12 to set up the punch bars to cause the punching of the indicia in the record 2 according to the code employed. It will be assumed for the purpose of this explanation that the code employed is a six level code. Further, it should be recalled that whether or not information is to be punched into the record 2 at any of the indicia row positions, the punch bar assigned to punch the sprocket aperture will nonetheless be operated. For each punch cycle of the punch mechanism 12 a signal will be fed to the three stage binary counter 20 to cause it to count from its reset condition of all zeros to a condition of 001 indicative of a count condition of 1. Further, the signal fed from the print punch device 12 will be fed via the line 18 to an input of the motor/clutch device 8. This input signal will cause the motor/clutch device 8 to make one full revolution and operate the drive rolls 14 to advance the record 2 an amount equal to the spacing between adjacent indicia row positions. The record 2 is passed into the loop 22 increasing the amount of record therein from its original content of 10 indicia row positions to 11. A similar operation will occur until eight indicia row positions have been punched by the punch mechanism 12 and the count in the counter 20 has arrived at eight and the buffer loop contains 18 indicia row positions. At this time, an output signal will be provided by the And gate 21 whose inputs are the one outputs of the 3 stages of the binary counter 20. The And gate 21 will produce an output signal which is impressed upon the set input of flip-flop 23. The set output of flip-flop 23 is then impressed upon a first input of the And gate 88. The output of And gate 21 will also be fed back to the counter 20 to reset it. The second input to the And gate 88, as described above, is the output of a further And gate 86 which is made responsive to the six one outputs of the six stages of the binary counter 126. As was described above, the counter 126 is driven by the code signals 70 upon the type drum 54 via the reluctance pickup 72 and the amplifier 74.

After the record 2 has been inserted into the interpreter a clear signal is applied to Or gate 122 to cause the flip-flop 120 to be reset and apply the comparator disable signal to the comparator 50 to prevent printing during initial record movement. The clear signal is also applied to Or gate 124 to reset the counter 126. As each count signal is produced and applied to the counter 126, it counts up until a count of 64 is reached at which time the And gate 86 is operated. The output of And gate 86 indicating a complete type drum 54 revolution has taken place together with the set output of flip-flop 23, indicating eight indicia row positions have been added to the buffer loop 22, both applied to And gate 88, cause And gate 88 to issue a signal. The output of And gate 88 is applied to control 97 to operate the motor/clutch 94 to cause via the gear box 92 the advancing of the record 2 by means of the drive rolls 90 and the rotation of the takeup reel 102. A signal is also issued prior to the start of motion of the drive rolls 90 and the takeup reel 102 on the line 95 to the tape guide and brake control 28 to cause the release of the brake 26.

The sequence of events which occur in the movement of the record 2 will now be summarized. The record 2 will be moved under control of the advance rolls 14 through the punching mechanism 12 into the buffer loop 22 until the buffer loop 22 contains a length of record equal to 18 indicia row positions and a signal is generated by the counter 20 indicating the completion of eight punching cycles. During this type, the type drum 54 is continually rotating and causing the counters 76 and 126 to be counted up. At sometime after the completion of the eight punch cycles and the generation of the output signal by the And gate 21, a signal will be produced indicative that counter 126 has arrived at a full count. The joint application of these two signals to the inputs of the And gate 88 will cause a signal to be generated and applied to the control 97. The control 97 will apply a signal via a first line to have caused the releasing of the brake 26 and the operation of the motor/clutch 92. The motor/clutch 92 will be operated to cause the rotation of the record drive rolls 90 and the rotation of the takeup reel 102, so that the record is moved through the reader 30 and the printer station 52, a distance equivalent to eight indicia row positions. As a result of such motion, the buffer loop 22 is diminished.

The punching and advancement of the record 2 will continue without any printing upon record 2 until the first indicia row position in which data is punched has been placed under the lamp 32 of the reader 30. At that time, the light which is permitted to pass from the lamp 32 through the concentrating and focusing lens 34, the mask 36, through any of the apertures 112-1 through 112-6 and 114 will impinge upon the various photocells 38 and affect the amplifiers 40. The code pattern read by the photocells 38 will then be inserted into stage 16, that is the lowest order stage of the shift register 42 in the levels 42-1 through 42-6. The application of a further set of signals due to the presence of the second indicia row under the lamp 32 will cause the transmission of a further six level code to the first stage of the shift register 42. As a result of such transmittal of further data the data already stored in stage 16 will be shifted into stage 15 and the incoming data will then be stored in stage 16. The reading operation will continue for the eight indicia rows presented in sequence to the reader 30 as the tape is moved therethrough. At the end of the reading of the eight indicia row positions, the shift register 42 will have data stored therein in the stages 9 through 16. The tape guide and brake control 28 will now operate brake 26 to stop further record 2 movement. Upon the concurrence of the output signal from the counter 126 and the output from the counter 20, the And gate 88 will issue a signal to cause the tape guide and brake 26 to be released via its control 28 and to operate the tape advance drive rolls 90, and the takeup reel 102 to advance the record 2 through the reader 30 and the printing station 52 a further eight indicia row positions. During the movement of the record 2 through the reader 30, a further block of eight indicia row positions will be read into the shift register 42 and in sequence will cause the shifting of the data from stage 9 to stage 8 and thence towards stage 1. At the end of this reading period, the shift register 42 will be completely filled storing data in each of the 16 locations in each of the six levels in accordance with the data punched into the record.

The printing operation is now ready to begin. It should be noted that the type drum 54 is displaced from the reading station 30 by a distance equal to 16 indicia row positions. As a result of this displacement, dictated by physical spacing limitations and the sixteen stage shift register the characters printed upon the record 2 will be adjacent the indicia row which produced the stored code and the printing will take place at a point in line with the sprocket aperture 114. This is shown more fully in FIGURE 3, where the symbols A and B have been shown printed adjacent the row positions 110A and 110B. In the event that an 8 character shift register 42 had been employed the offset of the type drum 54 with respect to the reading station would be such that the printed character would appear adjacent the sprocket aperture 114 of a character eight indicia row positions ahead of the indicia row which generated the character.

The data contained within the stages 1 through 8 of the shift register 42 are simultaneously applied to inputs of the comparator 50 such that the output of level 1 of stage 1 is applied via the line 48–1 to the first stage of the comparator 50. In a similar fashion, the output of the level 6 of the stage 1 of shift register 42 is applied via line 48–6 to the sixth level of the comparator 50 for the stage 1. The remaining levels of each one of the stages 1 through 8 are applied to similar levels of the stages 1 through 8 of the comparator 50. For the sake of simplicity, only the lines 48–1 and 48–6 for the first and sixth level of the first stage and lines 46–1 and 46–6 for the first and sixth level of the eighth stage have been shown. It should be understood, however, that each one of the levels of each of the stages is connected to a similar level and stage in the comparator 50. The second input to each of the levels of the stages of the comparator 50, are applied via the output lines 76–1 to 76–6 of the counter 76. That is, the output of stage 1, of the counter 76, is applied to the first level of each of the eight stages of the comparator 50, as shown by the line 76–1. In a similar fashion, the sixth level of each of the eight comparator stages is connected by means of a line 76–6. In this fashion, the output of the counter 76 is applied to its respective level in each one of the stages of the comparator 50. At an indeterminate time after the record 2 has come to rest within the print station 52, the rotation of the type drum 54 will present a flag signal 71 to its reluctance pickup 73, which will conduct a signal via the amplifier 75 to the reset terminal of the counter 76, jamming it to reset or all zero condition. Shortly after the occurrence of the flag signal, the first code signal 70, also recorded on the surface of the type drum 54 will be sensed. This signal is generated by a pre-recorded signal on the type drum 54 or the insertion of a small magnet or any other similar means. The code marks will be picked up by a reluctance pickup 72. A photoelectric pickup or the like may also be used. The output of the reluctance pickup 72 will provide a signal to the amplifier 74, which in turn will apply a signal via the line 78 as a count signal to cause the counting up of the counter 76. As is taught in the Gehring et al. Patent 2,915,967, for an Information Reproducing System, issued Dec. 8, 1959 and assigned to the assignee of the present invention and incorporated herein by reference, code pulses generated by code marks can be employed to control the various operations of a continuously rotating type drum printer. For example, the generation of the first pulse will cause the counter 76 to take on its first count position, indicative of, for example, the letter A. The output of the counter 76 will then be fed to each of the levels of the eight stages of the comparator 50 to determine whether or not a comparison exists, within the eight stages of the shift register 42.

The comparator 50 at this time, however, will be disabled as a result of the movement of the record 2 which caused the shift register 42 stages 9 to 16 to be loaded. It should be recalled the output of And gate 88 which caused the advancing of the record 2 was also applied to the delay flop 96. When the delay flop 96 issues its output, the comparator disable signal is removed due to the setting of flip-flop 120 and the counter 126 is reset. The next count signal will cause counter 76 to produce its first meaningful outputs and cause the counter 126 to count up to 1. Comparisons are now permitted between the outputs of shift register 42 and the counter 76. If such a comparison is found, a signal will be generated by the comparator for that particular stage and applied via the lines 50–1 through 50–8 to the hammer actuators 68 to cause the firing of one of the hammers 66 in accordance with the position in which such a comparison was found. For example, if the letter A was stored in the shift register 42 in stage 1, then the output signal from the counter 76 upon reaching the count of 1, would cause a match in the first stage of the comparator 50 and the issuance of a signal upon the line 50–1. This signal on the line 50–1 will cause the actuation of a hammer 66 for the column 1 and cause printing of the character A, adjacent the sprocket aperture 114, for the indicia row position which is punched with the code for the character A. As the type drum 54 continues to rotate, successive mark signals will be fed to the counter 76 to count it up and cause the presentation of the coded equivalent values of each of the type font 56 mounted around the periphery of the drum 54. As comparisons are found by the comparator 50, the respective hammers will be fired. Since the same characters are presented for each one of the eight columns across the width of the type drum 54, at sometime during a complete revolution of the type drum 54, there will be printed in each one of the eight indicia row positions, a printed character which is the equivalent of the punched value found therein.

Upon the completion of a full useful revolution of the type drum 56, as indicated by the counter going through a full count 000000 through 111111, signals will be presented to the And gate 86, indicative of the reaching of the full count of 63, or the 64th count condition of the counter 126. This signal will be applied as noted above, to Or gate 122 to reset flip-flop 120 and generate via line 98 the comparator disable signal to prevent overprinting. In addition the output of And gate 86 is fed to one input of the And gate 88 which will receive at its other input the eight count output signal of the binary counter 20. The concurrence of the two input signals at the And gate 88 indicate that the printing operation has been completed and further that at least eight indicia rows have been advanced through the printing device into the buffer loop 22. The output of And gate 88, as stated above, will cause the record 2 to be advanced, moving eight further indicia row positions into the interpreter.

It should be recalled that record 2 is brought to rest prior to the print operation and it is not desired to allow printing with the record in movement or so-called on the fly printing. Such attempts on the fly printing might cause destruction of the printing device or the record or the possible smearing of characters printed upon the record.

Due to the physical space limitations, it is not possible to mount the type drum 54 closer to the reader 30 than 16 indicia row positions. Therefore, the use of a shift register 42 containing 16 stages permits the information to be advanced in space far enough so that the characters are printed upon the record 2 adjacent the punch indicia which the printed character represents. Placement of the printed character is adjacent the sprocket aperture 114 for each of the characters. If it is desired to produce a unit of somewhat less cost and wherein it is permitted to print a character leading the punch notation which caused the print character, then the shift register 42 may be decreased in size to eight characters and the outputs from the amplifiers 40 fed directly into stage 8 of the shift register 42. The operation of the shift register would remain as described above, printing, however, would take place at a position eight characters in advance of the punched indicia indicative of such character.

Although the device has been described with reference to an associated punch mechanism 12, it should be understood that the punched record interpreter described herein may equally be employed with paper tape which has been pre-punched by some other remote unit. In such a situation the record 2 would then be introduced between the feed rolls 14 and caused to form a similar tape buffer loop 22. The operation of the device would be the same as that described with the exception that the counter 20 would be eliminated. Care must be taken to see that the buffer loop 22 and the record 2 fed through the feed rolls 14, is not tangled and that a proper record feeding speed is maintained to prevent breakage or destruction of the record 2. In this manner, a record 2 which has been produced by a similar device, may be introduced into the interpreter and the information found upon the record may be printed at either the eight character lead of the shift register 42, consists of eight stages or one character if the shift register 42 is of a 16 character length as described.

Figure 2:
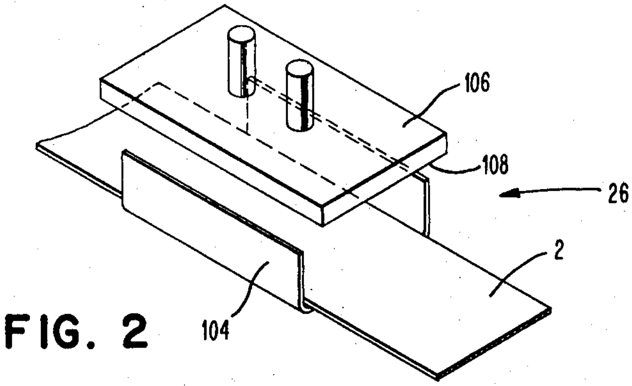
FIGURE 2 shows the tape guide and brake mechanism of FIGURE 1 in greater detail.

Turning now briefly to FIGURE 2 there is shown a more detailed view of the tape guide and brake 26 of FIGURE 1. The device consists of a U-shaped cradle 104 through which the record 2 is passed. Placed above the cradle and arranged to fit within it, is a brake shoe 106 upon which a brake material 108 has been deposited on the lower surface. When the control 28 of FIGURE 2 is operated, the device such that the brake shoe 106 is removed from contact with the record 2, the side walls of the cradle 104 provide a guiding means for the tape 2. When operated by the control 28, the brake shoe is moved downwardly so as to cause contact between the brake material surface 108 and the tape 102 forcing the tape against the bottom surface of the cradle 104 and causing the desired braking action.

While there have been shown and described and pointed out the fundamental novel features of the invention as applied to the preferred embodiments, it should be understood that various omissions and substitutions and changes of the form and details of the devices illustrated and in its operation may be made by those skilled in the art, without departing from the spirit of the invention.

The embodiments of the invention in which an exclusive property or privilege is claimed are defined as follows:

1. A record interpreting machine for interpreting records of indeterminate length having indica arranged in rows across the width of said records, placed at predetermined row positions along the length of said records comprising:

drive means for feeding said records past a record reading means and a printing means, said drive means intermittently moving said records step by step, each step constituting a predetermined plurality of row positions, reading means for reading the indicia of said predetermined plurality of row positions row by row while said records are in motion, storage means coupled to said reading means for storing the indicia read from said predetermined plurality of rows, and symbol printing means coupled to said storage means for printing upon said records while at rest and adjacent said predetermined plurality of row positions symbols corresponding to the indicia read from said predetermined plurality of row positions.

2. A machine as described in claim 1 wherein there is included a means for inhibiting the operation of said printing means during the operation of said drive means.

3. A record perforating-record interpreting machine comprising a record perforating device for perforating records of indeterminate length, said perforations being placed in rows across the width of said records, each of said rows comprising one or more perforations indicative of discrete indicia, first drive means for advancing said records through said record perforating device one row position at a time, a record interpreting device for interpreting said records of indeterminate length, second drive means for feeding said records past said record interpreting device, said drive means intermittently moving said records step by step, each step constituting a predetermined pluarlity of row positions, first counting means coupled to said record perforating device to produce a first output signal when said predetermined pluarlity of row positions on said record has advanced through said record perforating device, said record interpreting device including reading means for reading in a serial manner the indicia formed in said predetermined plurality of row positions while said records are in motion, storage means coupled to said reading means for storing the indicia read from said predetermined plurality of rows, symbol printing means coupled to said storage means for printing upon said records while at rest and adjacent said row positions symbols representative of the indicia read from said records, second counting means coupled to said printing means to produce a second output signal when said printing operation on said predetermined plurality of rows is completed, and control means coupled to said first and second counting means and said second drive means to operate said second drive means to cause said intermittent movement of said records through said record interpreting device.

4. A machine as described in claim 3 wherein a record brake device is inserted between said perforating device and said printing means, said brake device being adapted to engage said records and to normally arrest the motion thereof, and means coupled to said control means to disable said brake means during operation of said second drive means.

5. A machine as described in claim 3 wherein means are included to inhibit operation of said printing means during the operation of said second drive means.

6. A machine as described in claim 4 wherein a buffer supply loop is formed in the record path between the perforating device and the printing device and the said brake device is located between said buffer loop and said printing device.

7. A machine as described in claim 4 wherein there is included a means for inhibiting the operation of said printing means during the operation of said second drive means.

References Cited

UNITED STATES PATENTS

| | | | |
|---|---|---|---|
| 1,608,837 | 11/1926 | Bryce | 101—93 |
| 2,002,437 | 5/1935 | Maul | 101—47 |
| 2,053,063 | 9/1936 | Bryce | 101—93 |
| 2,915,966 | 12/1959 | Jacoby | 101—93 |
| 2,915,967 | 12/1959 | Gehring et al. | 101—93 |
| 2,918,658 | 12/1959 | Hoberg et al. | 340—174 |
| 2,927,528 | 3/1960 | Janke | 101—91 |
| 2,941,188 | 6/1960 | Flechtner et al. | 340—172.5 |
| 3,174,610 | 3/1965 | Barbagallo et al. | 197—133 |
| 3,247,788 | 4/1966 | Wilkins et al. | 101—93 |
| 3,277,448 | 10/1966 | Borrelli et al. | 340—172.5 |
| 3,353,481 | 11/1967 | Antonucci | 101—93 |

WILLIAM B. PENN, Primary Examiner

U.S. Cl. X.R.

101—19; 197—133; 235—61.11